D. Skidmore,
Knob Attachment.
Nº 35,899. Patented July 15, 1862.
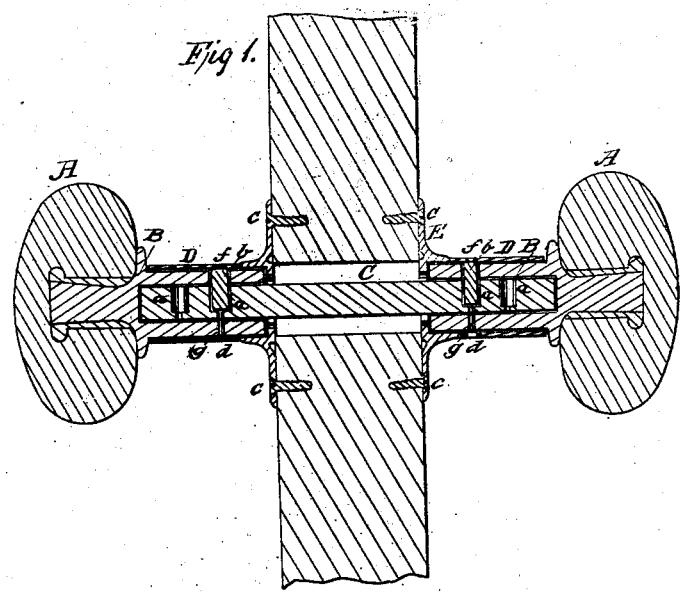
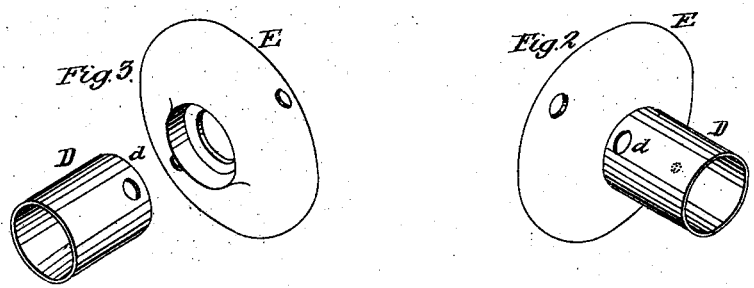
Witnesses
R. F. Osgood
D. C. Johnson
Inventor
Darius Skidmore
by J Fraser, his Attys

UNITED STATES PATENT OFFICE.

DARIUS SKIDMORE, OF SENECA FALLS, NEW YORK.

IMPROVED MODE OF FASTENING DOOR-KNOBS TO THEIR SPINDLES.

Specification forming part of Letters Patent No. 35,899, dated July 15, 1862.

*To all whom it may concern:*

Be it known that I, DARIUS SKIDMORE, of Seneca Falls, in the county of Seneca and State of New York, have invented a new and useful Improvement in Fastening the Shanks of Door-Knobs; and I do hereby declare that the following is a full and exact description thereof, reference being had to the accompanying drawings, making part of this specification.

Figure 1 is a central longitudinal section of a door-knob arranged in my improved manner, and applied to a door; Fig. 2, a perspective view of the sleeve and its rose or flange that fits over the shank of the knob; Fig. 3, a view similar to Fig. 2, but showing a modification of the sleeve and rose.

Like letters designate corresponding parts in all the figures.

The usual way of securing the shank of the knob to the spindle that passes through the door and operates the bolt or catch is by a small screw that passes in through both to couple them together. By the continual action of the knob in turning, the screw frequently becomes loose and falls out, and is thus a source of great annoyance.

It is the object of my invention to obviate this difficulty by securing the shank and spindle together in such a manner that they can never become uncoupled by accident.

As represented in the drawings, the general construction of the door-knob is as usual, consisting of hand-knobs A A, secured to shanks B B, which are coupled to the spindle C, that passes through the door. The usual holes, *a a*, are made in the spindle and a corresponding one through the shank to receive a coupling-pin, *b*, which I employ instead of the ordinary screw. I use the following arrangement to retain this pin in place: Over the cylindrical shank (which turns therein) closely fits a sleeve, D, of similar shape and of suitable length, having on its inner end a rose or flange, E, forming a part of it, and by which it is secured to the door by screws *c c*, as represented at the right hand in Fig. 1, and in Fig. 2. This sleeve has a hole, *d*, on the same plane in cross-section with the hole *a*, in which the coupling-pin fits, and of a size sufficient to allow the pin to drop through it. When this pin *b* is to be inserted in place, the sleeve is placed over the shank and the hole *d* therein brought in position over the corresponding holes in the shank and the spindle. The coupling-pin is then dropped through into its place, and the sleeve turned around on the shank a half-revolution till the hole *d* is opposite the entrance of the pin, as indicated in Fig. 1, when it is secured rigidly to the door by the screws *c c*.

Instead of having the sleeve D and rose E made in one piece, as above described, they may be made separately, as represented at the left hand in Fig. 1, and in Fig. 3. In this case the sleeve acts independently of the rose, and when the coupling-pin has been inserted in its place it is turned around to the opposite position, and then turns only with the knob. The design and use of this modification of the sleeve are the same as that at first described—viz, to retain the coupling-pin in place when once inserted; but I prefer the former arrangement, as it is cheaper and more effective, the sleeve and rose being cast in a single piece and retained in such a position that the pin can never escape. Thus arranged, the coupling-pin is always securely held in position, and can be removed only by design. The necessity of a screw is also obviated, a plain pin perfectly answering the purpose, and the cost of cutting a screw-thread in the hole in which the pin fits is avoided. The arrangement is simple and cheap and easily applied.

In order to remove the coupling-pin *b* when desired, I make a hole, *f*, of smaller size than the hole *d*, directly opposite it in the sleeve, and a correspondingly-small passage, *g*, from the bottom of the hole *a* to the outside of the shank. The rose is unscrewed from the door, and its position reversed from that represented in Fig. 1 and the pin driven out by a small point inserted from the under side. The pin *b* might extend entirely through from side to side of the shank, if desired, the holes in the sleeve being arranged as above described, with the same effect.

What I claim as my invention, and desire to secure by Letters Patent, is—

The sleeve D, provided with a hole, *d*, either forming a part of or detached from the rose E, when the same is used in connection with the shank B for holding the coupling-pin in place, arranged substantially as herein described.

In witness whereof I have hereunto signed my name in the presence of two subscribing witnesses.

DARIUS SKIDMORE.

Witnesses:
J. FRASER,
R. F. OSGOOD.